No. 825,815. PATENTED JULY 10, 1906.
S. E. FARNHAM.
POWER TRANSMITTING GEAR.
APPLICATION FILED OCT. 16, 1905.

2 SHEETS—SHEET 1.

Witnesses:
George Felter.
Fred Palm.

Inventor:
Schuyler E. Farnham.
By Oliphant & Young.
Attorneys.

No. 825,815. PATENTED JULY 10, 1906.
S. E. FARNHAM.
POWER TRANSMITTING GEAR.
APPLICATION FILED OCT. 16, 1905.

2 SHEETS—SHEET 2.

Witnesses:
George Felber.
Fred Palin.

Inventor:
Schuyler E. Farnham.
By Oliphant and Young
Attorneys.

UNITED STATES PATENT OFFICE.

SCHUYLER E. FARNHAM, OF RACINE, WISCONSIN, ASSIGNOR, BY MESNE ASSIGNMENTS, TO NATIONAL MFG. & MAILING CO., OF RACINE, WISCONSIN, A CORPORATION OF WISCONSIN.

POWER-TRANSMITTING GEAR.

No. 825,815.  Specification of Letters Patent.  Patented July 10, 1906.

Application filed October 16, 1905. Serial No. 282,929.

*To all whom it may concern:*

Be it known that I, SCHUYLER E. FARNHAM, a citizen of the United States, and a resident of Racine, in the county of Racine and State of Wisconsin, have invented certain new and useful Improvements in Power-Transmitting Gearing; and I do hereby declare that the following is a full, clear, and exact description thereof.

My invention consists in certain peculiarities of construction and combination of parts, hereinafter particularly set forth with reference to the accompanying drawings and subsequently claimed, its object being to provide simple, economical, compact, and efficient power-transmitting mechanism especially designed as a speed changing and reversing gear for a motor-vehicle, but which is just as applicable in whole or in part to a variety of machines, important features of the mechanism being the accessibility of its various elements and the provision had for ready compensation for wear of parts of its clutch connections.

Figure 1:
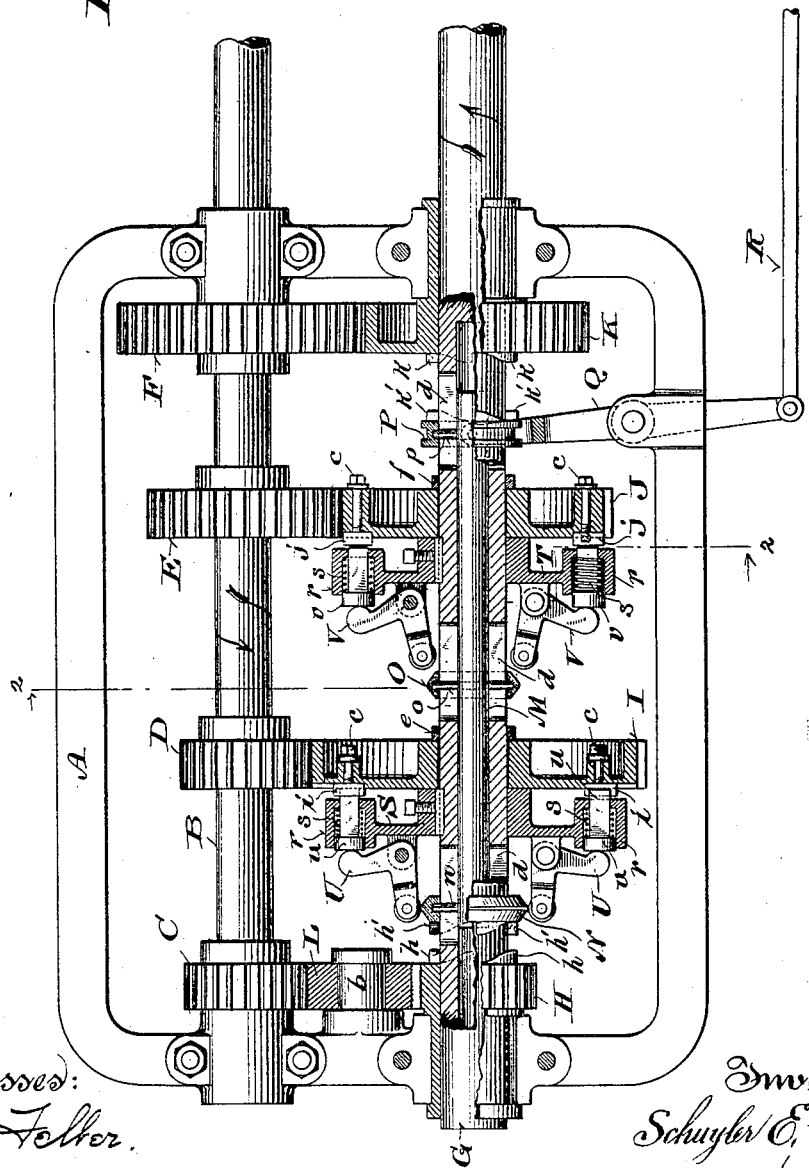
Figure 2:
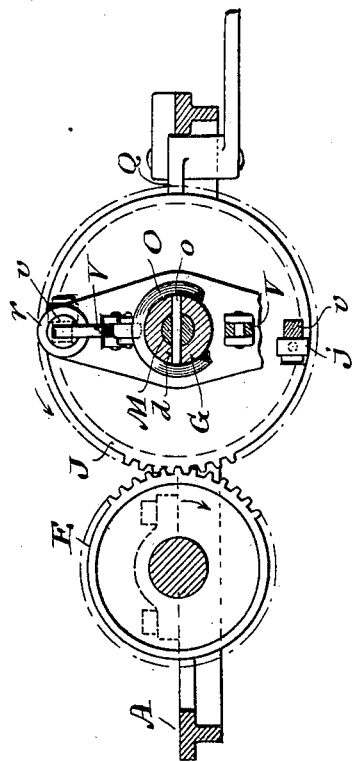
Figure 3:
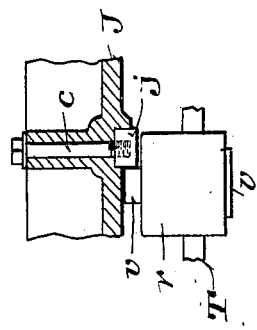

Figure 1 of the drawings represents a plan view of power-transmitting mechanism in accordance with my invention and partly in horizontal section; Fig. 2, a sectional view indicated by lines 2 2 in Fig. 1, and Fig. 3 a partly-sectional plan view of a fragment of a clutch portion of the mechanism.

Referring by letter to the drawings, A indicates a frame or section of a casing constituting a support provided with bearings for a drive-shaft B, on which shaft a series of spur-gears C, D, E, and F of varying size are keyed or otherwise fastened. Parallel to the shaft B is another shaft G, that is hereinafter referred to as the "driven" shaft. Loosely mounted on the shaft G is a series of spur-gears H, I, J, and K of varying size. Extended and flanged hubs of the gears H K serve as bearings for the shaft G and are themselves in bearings with which the support A is provided. The gear C of the drive-shaft and the gear H of the driven shaft are in mesh with an interposed idler-gear L, loose on a stud $b$ of the aforesaid support, and the gears D E F of said drive-shaft are, respectively, in mesh with the gears I J K on said driven shaft, the meshing of the several gears being permanent.

One side of the gear H is provided with clutch-teeth $h$, and one side of the gear K is provided with similar teeth $k$, whereby said gears are made to constitute clutch members of the mechanism herein specified. Seated in squared recesses in one side of the gear I are projecting blocks $i$ of corresponding shape, and these blocks are virtually nuts on bolts $c$, extending through said gear. The gear J is similarly equipped with blocks $j$, and by means of their projecting side blocks both gears I J are made to constitute clutch members of the mechanism aforesaid.

The shaft G is hollow for a portion of its length, and at intervals longitudinally of said shaft are slots $d$, that communicate with its bore. Guided in the shaft-bore is a rod M, and engaging the slots in said shaft are pins $n\ o\ p$, that extend through the rod and are fast in the same. Wedge-rim collars N O and a spanner-collar P are shown loose on the shaft G and fast on the pins aforesaid. One side of the collar N is provided with clutch-teeth $h'$ and one side of the collar P is provided with similar teeth $k'$, whereby said collars are made to constitute clutch members and respectively coöperate with the combined gear and clutch members H K, above described. The spanner end of the lever Q engages the collar P, and this lever is fulcrumed in connection with the support A, its other end being shown in connection with a throw rod or link R for attachment to a more or less distant actuating device. It is within the scope of my invention to omit the collars N O and to substitute keys for the pins $n\ o$, that extend through the rod M and longitudinal slots of the driven shaft. It is also practical to use means other than what is herein specified for shifting said rod and clutching the same with the otherwise loose gear K on the driven shaft.

The loosely-mounted gears I J are caught between shaft-collars $e\ f$ and spiders S T, these spiders being keyed or otherwise fastened on the shaft G, and each of them is provided with housings $r$ for spiral springs $s$, that surround the squared shanks of headed dogs, these shanks being guided in corresponding apertures in said housings and serving as clutch-teeth whereby said spiders are made to constitute clutch members of the herein-described mechanism. Fulcrumed in connection with ears of the spider S are bell-crank levers U, and similar levers V are fulcrumed in connection with ears of the spider T. One arm of each bell-crank lever U abuts the head of a spring-controlled dog $v$ of the spider S, and the other arm of said lever is provided with an antifriction-roller in the path of the wedge-collar N or its equivalent in connection with the rod M, that is adjustable in the shaft G, longitudinally of the same. One arm of each bell-crank lever V abuts the head of a spring-controlled dog $v$ of the spider T, and the other arm of said lever is provided with an antifriction-roller in the path of the wedge-collar O or its equivalent in connection with the aforesaid rod.

From the foregoing it will be understood that when the rod M is in one position of its adjustment and the drive-shaft is turning, the several gears H, I, J, and K will run loose on the shaft G, that is then at rest. The lever Q, being moved in the proper direction, the wedge-collar N or its equivalent in connection with the rod M will operate the bell-crank levers U to shoot the dogs $u$ of the spider S against spring resistance into position to come into abutment against the blocks or clutch-teeth $i$ of the gear I, thus putting said gear into clutch with the shaft G, that is now driven at a predetermined speed. Further movement of the rod M in the same direction will result in an operation of the bell-crank levers V by the wedge-collar O or its equivalent to shoot the dogs $v$ of the spider T against spring resistance into position to come into abutment against the blocks or clutch-teeth $j$ of the gear J, whereby said gear is put into clutch with the shaft G, that is now driven at a predetermined higher speed than before. Further movement of the rod M in the same direction as before will result in a clutch of the spanner-collar P or its equivalent with the gear K to drive the shaft G at maximum speed while the other gears on the same shaft run idle.

The speed of the driven shaft may be gradually reduced by a step-by-step reverse adjustment of the rod M, or it may be put immediately at slow speed or brought to a stop by the proper manipulation of said rod. If the reverse movement of the aforesaid rod is sufficient to bring the wedge-collar N or its equivalent into clutch with the gear H, the rotation of the driven shaft will be the reverse of what occurs when the gears I, J, or K are clutched therewith. From time to time, as opportunity affords, the dogs $u\,v$ and bell-crank levers U V are automatically returned to normal position by expansion of the springs $s$, and said dogs and the blocks $i\,j$ may be shifted a quarter-turn from time to time to compensate for the wear that comes upon their contact-surfaces.

Having thus described my invention, what I claim as new, and desire to secure by Letters Patent, is—

1. The combination of parallel driving and driven shafts, gears of varying size fast on one of the shafts, corresponding gears loosely mounted on the other shaft each in mesh with a fixed gear and provided with side teeth to constitute a clutch member, other clutch members fast on the shaft for the loosely-mounted gears, a rod adjustable longitudinally of the same shaft within the same, and means in connection with the rod and fixed clutch members for locking these fixed clutch members alternately in engagement with an opposing loosely-mounted gear.

2. The combination of parallel driving and driven shafts, gears of varying size fast on one of the shafts, corresponding gears loosely mounted on the other shaft each in mesh with a fixed gear and provided with side teeth to constitute a clutch member, spiders fast on the shaft for the loosely-mounted gears, spring-controlled sliding dogs carried by the spiders, bell-crank levers in connection with said spiders and arranged to coincide with said dogs, a rod adjustable longitudinally of the shaft with which the aforesaid spiders are rigid, and means in conjunction with the rod to actuate the bell-crank levers and thereby shoot the aforesaid dogs against spring resistance into position to catch against the side teeth of loosely-mounted gears.

3. The combination of parallel driving and driven shafts, gears of varying size fast on one of the shafts, corresponding gears loosely mounted on the other shaft, each in mesh with a fixed gear and provided with side teeth to constitute a clutch member, other clutch members fast on the shaft for the loosely-mounted gears, a rod adjustable longitudinally of the same shaft within the same, means in connection with the rod and fixed clutch members for locking each of these fixed clutch members one at a time in engagement with an opposing loosely-mounted gear, and means also in connection with said rod for clutching the adjacent shaft with another of said loosely-mounted gears.

4. The combination of parallel driving and driven shafts, gears of varying size fast on one of the shafts, corresponding gears loosely mounted on the other shaft and each provided with side teeth to constitute a clutch member, certain of these loosely-mounted gears being in mesh with fixed gears, an idler-gear in mesh with a fixed gear and a loosely-mounted gear, other clutch members fast on the shaft for the loosely-mounted gears, a rod adjustable longitudinally of the same shaft within the same, means in connection with the rod and fixed clutch members for locking these fixed clutch members one at a time in engagement with an opposing loosely-mounted gear, and means also in connection with said rod for clutching the adjacent shaft with the loosely-mounted gear in mesh with the idler-gear.

5. The combination of parallel driving and driven shafts, gears of varying size fast on one of the shafts, corresponding gears loosely mounted on the other shaft and each provided with side teeth to constitute a clutch member, certain of these loosely-mounted gears being in mesh with fixed gears, an idler-gear in mesh with a fixed gear and a loosely-mounted gear, other clutch members fast on the shaft for the loosely-mounted gears, a rod adjustable longitudinally of the same shaft within the same, means in connection with the rod and fixed clutch members for locking these fixed clutch members one at a time in engagement with an opposing loosely-mounted gear, and means also in connection with said rod for clutching the adjacent shaft with a remaining loosely-mounted gear in mesh with a fixed gear and with the loosely-mounted gear in mesh with the idler-gear.

6. The combination of a shaft, a rod adjustable in the shaft longitudinally of the same, gears loosely mounted on said shaft and provided with side teeth to constitute clutch members, spiders fast on the aforesaid shaft, spring-controlled sliding dogs carried by the spiders, bell-crank levers in connection with the fixed clutch members to coincide with said dogs, devices in connection with said rod for actuating the bell-crank levers to thereby shoot the dogs against spring resistance into position to catch against side teeth of loosely-mounted gears, other means in conjunction with said rod for clutching others of said loosely-mounted gears in connection with the aforesaid shaft, an idler-gear in mesh with one of the loosely-mounted gears, another shaft, and fixed gears on the latter shaft one of which is in mesh with the idler-gear and the remainder with loosely-mounted gears on the former shaft.

7. The combination of a driving and driven shaft, a fixed gear on one of the shafts a corresponding gear loosely mounted on the other shaft in mesh with the fixed gear, squared blocks detachably seated in side recesses of the loosely-mounted gear to project therefrom, a spider fast on the shaft for the loosely-mounted gear and provided with housings, spiral springs in the housings, dogs having heads opposing the springs and squared shanks guided in corresponding apertures of said spider, and means for shooting the dogs into position to catch against the blocks aforesaid.

In testimony that I claim the foregoing I have hereunto set my hand, at Racine, in the county of Racine and State of Wisconsin, in the presence of two witnesses.

SCHUYLER E. FARNHAM.

Witnesses:
   ANDREW DIETRICH,
   LOUIS E. HALL.